United States Patent
Tabuki

Patent Number: 5,987,232
Date of Patent: Nov. 16, 1999

[54] VERIFICATION SERVER FOR USE IN AUTHENTICATION ON NETWORKS

[75] Inventor: Takaaki Tabuki, Setagaya-ku, Japan

[73] Assignee: Cadix Inc., Tokyo, Japan

[21] Appl. No.: 08/925,634

[22] Filed: Sep. 9, 1997

Related U.S. Application Data

[63] Continuation of application No. 08/671,242, Jun. 27, 1996, abandoned.

[30] Foreign Application Priority Data

Sep. 8, 1995 [JP] Japan .................................. 7-231161

[51] Int. Cl.⁶ .................................................. G06F 11/00
[52] U.S. Cl. ............................ 395/187.01; 395/200.59
[58] Field of Search ........................................ 380/4, 23

[56] References Cited

U.S. PATENT DOCUMENTS

| | | | |
|---|---|---|---|
| 5,235,642 | 8/1993 | Wobber et al. ................... | 380/25 |
| 5,249,230 | 9/1993 | Mihm, Jr. ............................ | 380/23 |
| 5,339,361 | 8/1994 | Schwalm et al. .................. | 380/23 |
| 5,343,529 | 8/1994 | Goldfine et al. ................... | 380/23 |
| 5,455,953 | 10/1995 | Russell .............................. | 395/739 |
| 5,469,564 | 11/1995 | Junya ............................... | 395/188.01 |
| 5,469,576 | 11/1995 | Daverer et al. ................... | 395/186 |
| 5,475,625 | 12/1995 | Glaschick .......................... | 395/600 |
| 5,513,272 | 4/1996 | Bogosian, Jr. .................... | 382/116 |
| 5,553,239 | 9/1996 | Heath et al. ...................... | 395/187.01 |
| 5,560,008 | 9/1996 | Johnson et al. ................... | 395/650 |
| 5,581,763 | 12/1996 | Hait .................................. | 395/186 |
| 5,615,277 | 3/1997 | Hoffman ........................... | 382/115 |

FOREIGN PATENT DOCUMENTS

| | | |
|---|---|---|
| 60-130939 | 7/1985 | Japan . |
| 62-103796 | 5/1987 | Japan . |
| 62-121573 | 6/1987 | Japan . |
| 4-148225 | 5/1992 | Japan . |
| 6-52111 | 2/1994 | Japan . |
| 6-243157 | 9/1994 | Japan . |
| 6-332861 | 12/1994 | Japan . |
| 7-29005 | 1/1995 | Japan . |

OTHER PUBLICATIONS

English–language abstract of 60–130939.
English–language abstract of 62–103796.
English–language abstract of 62–121573.
English–language abstract of 4–148225.
English–language abstract of 6–52111.
English–language abstract of 6–243157.
English–language abstract of 6–332861.
English–language abstract of 7–29005.

*Primary Examiner*—Robert W. Beausoliel, Jr.
*Assistant Examiner*—Scott T. Baderman
*Attorney, Agent, or Firm*—Oliff & Berridge, PLC

[57] ABSTRACT

The authentication of users on networks is performed more easily and efficiently, as follows:

Authentication data sent from the application client 20 is relayed to a verification server 30 by the application server 10. The verification server 30 maintains a database of valid authentication data, against which it verifies received authentication data. Verification results are sent to the application server 10, which then processes users on the basis of these results. As a result, the configuration of application servers 10 is simplified. Verification servers or servers 30 can be used by a plurality of application servers 10, allowing for the efficient use of resources on a network.

5 Claims, 6 Drawing Sheets

| | | | FLAG |
|---|---|---|---|
| | | | SYSTEM UNIQUE KEY |
| | | | REGISTERED TABLET TYPE |
| | | | SIGNATURE DATA |
| | | | NAME |
| | | | DATA OF BIRTH |
| | | | PHONE # |
| | | | CREATION DATE |
| | | | CREATION HOST |
| | | | LAST ACCESS DATE |
| | | | LAST ACCESS BY |
| | | | ACCESS COUNT |
| | | | FAILURE COUNT |

NAME, DATA OF BIRTH, PHONE # — SYSTEM REQUIRED DATA

CREATION DATE, CREATION HOST, LAST ACCESS DATE, LAST ACCESS BY, ACCESS COUNT, FAILURE COUNT — OPTIONAL FIELDS

Fig. 3

| | | | |
|---|---|---|---|
| | | | VERIFICATION SERVER NAME |
| | | | FLAG |
| | | | SYSTEM UNIQUE KEY |
| | | | APPLICATION USER KEY |
| | | | ADDITIONAL APPLICATION USER KEY |
| | | | CREATION DATE |
| | | | LAST ACCESS DATE |
| | | | LAST ACCESS BY |
| | | | ACCESS COUNT |
| | | | FAILURE COUNT |
| | | | |
| | | | |
| | | | |
| | | | |
| | | | |
| | | | |

APPLICATION OPTIONAL FIELDS (braces the last several rows)

Fig. 4

VERIFICATION SERVER PROTOCOLS

DATA COMMON TO ALL REQUESTS: DATA VERSION, ENCRYPTION TYPE, COMPRESSED TYPE

| REQUEST | DATA DEPENDENT ON REQUEST | RETURNED VALUE | EXPLANATION |
|---|---|---|---|
| KEY REGISTRATION | SYSTEM REQUIRED DATA (NAME, BIRTH DATE, PHONE) | SYSTEM UNIQUE KEY ERROR | PROVIDES VERIFICATION SERVER WITH SYSTEM REQUIRED DATA AND OBTAINS SYSTEM UNIQUE KEY (REGISTRATION KEY). |
| SIGNATURE DATA REGISTRATION | SYSTEM UNIQUE KEY, 3 SIGNATURE DATA, TABLET TYPE | OK/ERROR UNSTABLE | SEND A NUMBER OF SIGNATURE DATA TOGETHER WITH SYSTEM UNIQUE KEY |
| VERIFICATION | SYSTEM UNIQUE KEY, SIGNATURE DATA, TABLET TYPE, MESSAGE ID | YES NO MAY BE ERROR | SEND SIGNATURE DATA FOR VERIFICATION TOGETHER WITH SYSTEM UNIQUE KEY AND REQUEST VERIFICATION. IF VERIFICATION PREPARATION HAS BEEN REQUESTED, ADD MESSAGE ID |
| VERIFICATION PREPARATION | SYSTEM UNIQUE KEY | ERROR MESSAGE ID, ENCRYPTION KEY | REQUEST THAT SIGNATURE DATA CORRESPONDING TO SYSTEM UNIQUE KEY BE READ FROM RDB IN ADVANCE. VERIFICATION USING RETURNED MESSAGE ID |

Fig. 5

VERIFICATION SERVER FOR USE IN AUTHENTICATION ON NETWORKS

This is a Continuation of application Ser. No. 08/671,242 filed Jun. 27, 1996, now abandoned.

BACKGROUND OF THE INVENTION

1. Field of the Invention

The invention relates to a verification server used as a means for the authentication of application users, and in particular for the authentication of users on a network.

2. Description of the Prior Art

In banking and other service industries, establishing the identities of clients, in other words, authentication, is an extremely important problem. Proper authentication is required in order to protect against any attempts by an impostor to withdraw or deposit money from another person's account.

The standard means of authentication is to ask to see some form of identification card, such as a driver's license. However, with the proliferation of automatic teller machines and other automatic devices in recent years, different means of authentication using magnetic cards and passwords have come into widespread use.

Some means of authentication is also necessary in fields other than banking. For example, at research institutions, in order to prevent secrets from being leaked, often only those with the proper clearance are permitted to enter certain restricted areas. Private membership clubs also often require some means of identification and authentication to prove membership. At these research institutions and clubs, the use of magnetic membership cards and passwords, is quite common. However, magnetic cards can be lost, and passwords can easily be forgotten. Thus, other means of establishing the identity of an individual using biometric physical quantities such as fingerprints, retinal patterns, etc. as data for authentication (hereinafter, authentication data) have also been proposed.

The use of signatures, an individual physical quantity, in the endorsement process for electronic business documents for identification and approval is a natural continuation of the signatures use on paper documents. In recent years the use of computer graphic systems in business has been growing, and signature data can be stored in the form of an image and can be pasted onto other computer data to indicate approval.

With the development of networks, it is now possible to provide a variety of services to a very large number of users on a network. The internet, for example, provides a wide spectrum of multimedia services, such as the WWW (World Wide Web). In some cases, as with services in banking, etc., access to these network services is granted only to individuals with proper identification, and therefore authentication is also an extremely important issue in providing network services.

However, for authentication of the identities of individuals on a network, use of the above-mentioned biometric authentication data is generally extremely difficult. For example, it would be necessary to install devices to read retinal patterns, fingerprints or palmprints at each and every terminal, and a system for relaying the data for such physical quantities over the network would have to be devised.

As a result, attention is focusing on the use of signature data as an individual physical quantity that can be used for verification on networks. Signature data has some advantages. For example, a signature can be easily input using a so-called tablet. The data may include not only the two-dimensional image data, but also changes in stylus pressure as well as the writing speed in order to establish the identity of the individual. A further characteristic is that tablets are available at a reasonable price, so that the cost of terminals can be kept low.

Recently, the biometric authentication data and signature data described above are being used in some networks as a means of authentication.

However, at the same time, the size of networks is increasing, the types of application servers providing services is increasing, and the number of clients receiving such services is reaching an extremely large scale. In particular, in networks like the Internet which is on a worldwide scale, there are many cases where the application server and the clients receiving its services are separated by extremely large distances. In such cases, the increase in traffic on the network resulting from exchanges of these more complex authentication data can be a large problem.

SUMMARY OF THE INVENTION

The invention was made to resolve the problems described above. The purpose of the invention is to alleviate the burden on the application server, and to make it possible for client authentication to be performed easily and efficiently. The invention accomplishes this by establishing a verification function on the network which authenticates network clients independently of the application server.

In accordance with a first aspect of the invention, the verification server, which verifies the authentication data of specified network users, comprises: a memory means to record the valid authentication data for network users; a search means which, in response to verification requests from external sources, retrieves the valid authentication data for the specified network user from the memory device; a verification means which, in response to verification request, compares the authentication data relating to the verification request with the valid authentication data which is retrieved by the search means; and a sending means to send the verification results.

By means of such a configuration, it is possible to centralize the verification process for use by a number of application servers as they require the authentication of users.

This centralization of the verification functions which are conventionally possessed by each application server, allows a more efficient use of resources.

In accordance with a second aspect of the invention, the verification server described in the first aspect of the invention further comprises: a table means, included in the memory means, consisting of identification data for network users, valid authentication data for network users, and other specified data concerning the network users which may be used by the verification server; and the said search means, characterized by its ability to use either of the identification data or the other specified data as a key to retrieve the valid authentication data from the memory means.

Since the key for retrieving the valid authentication data can be either the identification data or other specified data, even in cases where the user forgets his/her identification data, it is still possible to retrieve the valid authentication data.

For example, it is possible to use the user's name, telephone number, date of birth, etc. as the other specified data. Other data that can contribute to some extent in identifying the user, such as blood type, can also be used.

In accordance with a third aspect of the invention, the verification server described in the first aspect of the invention further comprises a cache control means to transfer the valid authentication data of a network user from the memory device to a cache means which has an access speed that is faster than that of the memory device.

In this third aspect of the invention, after a verification request, the valid authentication data is sent, in advance, into a cache, so that it is possible to begin the verification process quickly when the authentication data for the specified user is actually received.

As a result, it is possible to speed up the authentication process.

BRIEF DESCRIPTION OF THE DRAWINGS

FIG. 3 is a table showing the structure of the RDB in the verification server.

FIG. 4 is a table showing the structure of the RDB in the application server.

FIG. 5 is a table explaining the protocols supported by the verification server.

DESCRIPTION OF THE PREFERRED EMBODIMENTS

The preferred embodiments of the invention are described below with reference to the accompanying figures.

Figure 1A:
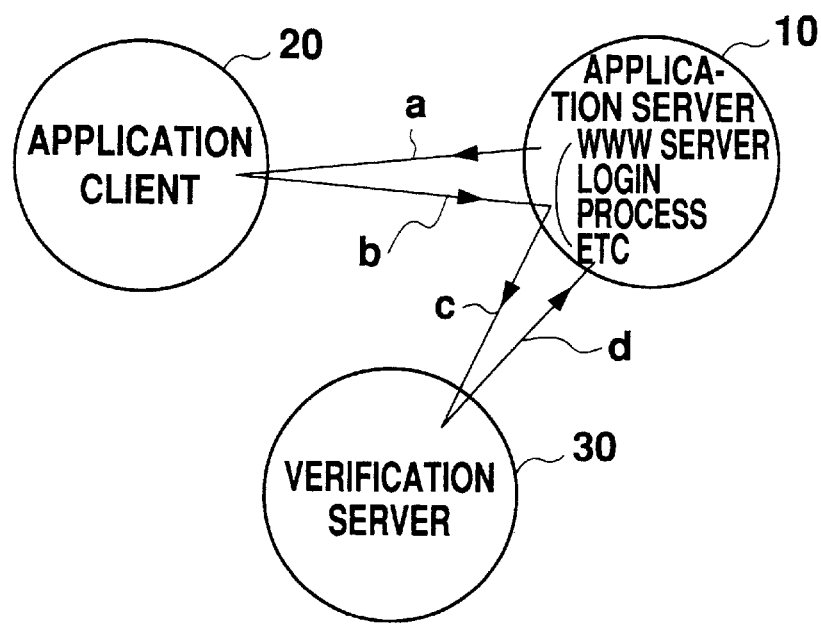
FIG. 1A is a drawing showing a configuration of a preferred embodiment.
Figure 1B:
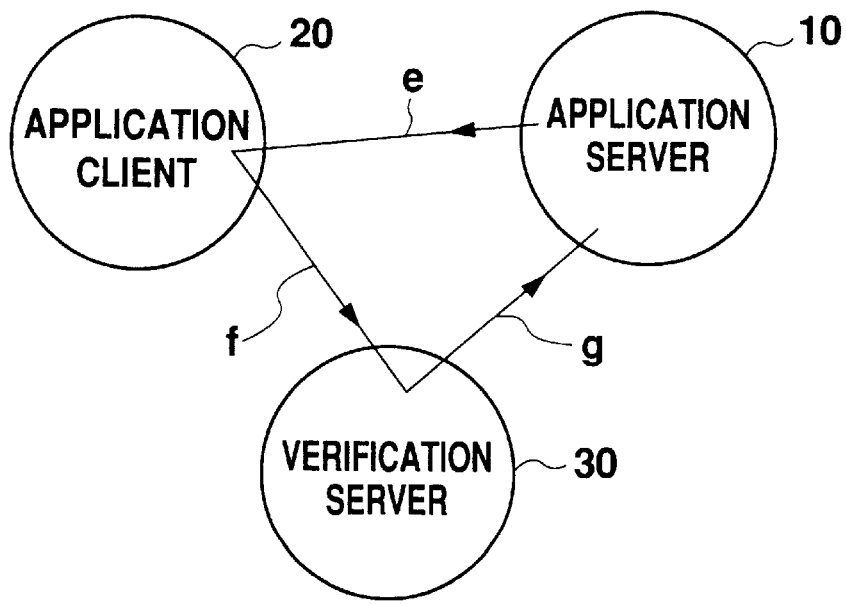
FIG. 1B is a drawing showing a configuration of a preferred embodiment.

FIG. 1A and FIG. 1B show a simple network consisting of an application server 10, a application client 20 making use of the application server, and a verification server 30 which is used to authenticate the application client 20.

The verification process for authenticating application client 20 is not performed by the application server 10 but by the verification server 30 which is independent of the application server 10. By establishing a separate verification server 30 to perform the verification process, the application server 10 is freed from the need to keep valid authentication data for the authentication of application clients 20 and the need to have verification functions. Further, although only one application server 10 is shown in FIG. 1A and FIG. 1B, it is also common to have a plurality of application servers 10 on the network, and consigning the verification processes for all application servers 10 to a single verification server 30, thereby combines the multiple verification data and functions to allow for the efficient use of resources.

Further, it is also possible to establish a plurality of verification servers 30 on the network. In this way, each application server 10 can resort to a suitable verification server depending on the sort of authentication required. For example, it is possible to store signature authentication data and fingerprint authentication data in separate verification servers 30. It is also possible for each user to designate a particular verification server 30 in which his/her authentication data is kept, or system administrators may, for management purposes, make use of different verification servers for different users.

An example of the exchange of messages during authentication is shown by the sequence of arrows in FIG. 1. In FIG. 1A, first the application server 10 requests application client 20 to send authentication data ("a" in FIG. 1A). Conventionally, passwords or membership numbers can be used as authentication data; however, it is becoming more common to use physical quantities such as signatures. In particular, as mentioned above, signature data can be input using a low-priced tablet at the application client 20 and thus signature authentication data is used for the preferred embodiments.

The application client 20, in response to request a, sends the user's signature data, which has been input using a tablet, to the application server 10 ("b" in FIG. 1A) together with the user's identification data (for instance, a membership number or user name). Generally, the application server 10 would save the authentication data and verify it against the valid authentication data in order to determine whether the application client 20 is an authorized user. However, in this invention, since the verification process is consigned to the separate verification server 30, the application server 10 sends a message including the authentication data and identification data received from the application client 20 to the verification server 30, requesting a verification ("c" in FIG. 1A).

The verification server 30, upon receiving the message including the authentication data and the identification data from application server 10, begins the process to determine whether the authentication data matches the valid authentication data. The verification server 30 has an internal database which contains user names and valid authentication data for each user. This database is searched to retrieve the valid authentication data for the identity claimed by the application client 20. The retrieved valid authentication data and the authentication data received from application server 10 are compared, and the verification result is sent to application server 10 ("d" in FIG. 1A). Based on this verification result, application server 10 responds to application client 20.

In the preferred embodiments, a network element for performing the verification process is established independent from the application server 10, in order to eliminate redundant verification functions in a plurality of application servers 10 and increase the accuracy of the authentication process.

In FIG. 1A, the authentication data from the application client 20 is sent to the verification server 30 via the application server 10, however, it is also possible to send directly from the application client 20 to the verification server 30.

FIG. 1B shows an example in which the authentication data is sent directly from the application client 20 to the verification server 30. First, the application server 10 requests the application client 20 to send authentication data to the verification server 30 ("e" in FIG. 1B).

In response to request e, the application client 20 sends the user's signature data, which has been input using a tablet, to the verification server 30 ("f" in FIG. 1B). The application server 10 determines whether the application client 20 is an authorized user, based on the result of the verification process performed by the verification server 30. The verification server stores the authentication data which it receives from the application client 20, and then compares it with the valid authentication data. As with the example shown in FIG. 1A, the verification server 30 maintains an internal database containing user names and the valid authentication data for each user. This database is searched to retrieve the valid authentication data for the identity claimed by the application client 20. The authentication data received from the application client 20 is compared against the retrieved valid authentication data, and the verification result is sent to application server 10 ("g" in FIG. 1B). Based on this verification result, application server 10 responds to application client 20.

In both FIG. 1A and FIG. 1B, the application server 10 can correspond to servers such as a WWW server or other servers providing various databases and services.

Figure 2A:
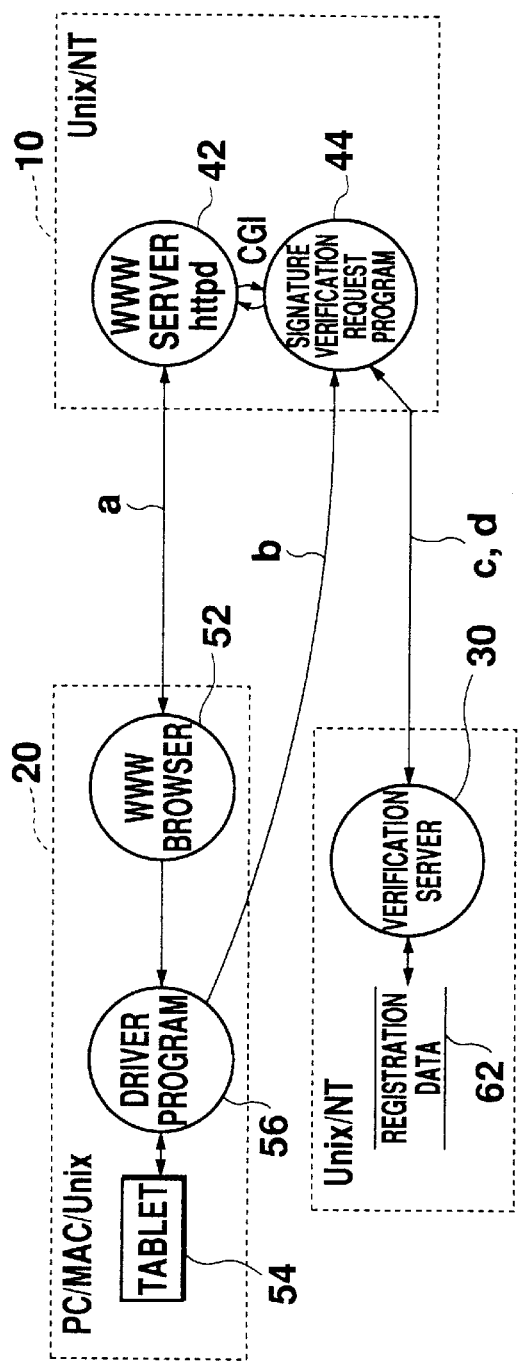
FIG. 2A is a drawing showing a detailed configuration of a preferred embodiment.

FIG. 2 includes block diagrams showing the detailed configuration of the application client 20, application server 10 and the verification server 30 shown in FIG. 1. FIG. 2A corresponds to FIG. 1A. In FIG. 2A, the application client 20 is configured as a terminal, such as a personal computer, and is linked to the Internet and connected to a WWW server 42 by means of a WWW browser 52. Although Netscape is used in the preferred embodiment, Mosaic or some other WWW browser may also be used. Aside from the WWW browser software 52, the application client 20 is also equipped with a tablet 54 by means of which users can input signature data. Further, a tablet driver program 56 is used to control the tablet and to extract the signature data. When a request arrives from application server 10 for authentication data, the tablet driver program 56 receives this request via WWW browser 52, and sends the authentication data (signature data), which has been input through tablet 54 to application server 10. Here, "a", "b", "c", and "d" correspond with the exchange of messages "a", "b", "c", and "d" shown in FIG. 1A.

The application server 10 is frequently a UNIX system. As shown in FIG. 2A, a WWW server 42, providing multimedia services and a signature verification request program 44, to check the access rights of users, are installed on the application server 10. The verification server 30, like the application server, can be on a UNIX or other system, and includes registration data 62 with a list of authorized users and their valid authentication data. Based on the user name (user identification code) it receives from the signature verification request program 44 and the authentication data it receives from the application client 20, the verification server 30 checks the data and returns a verification result to the signature verification request program 44 of application server 10.

Figure 2B:
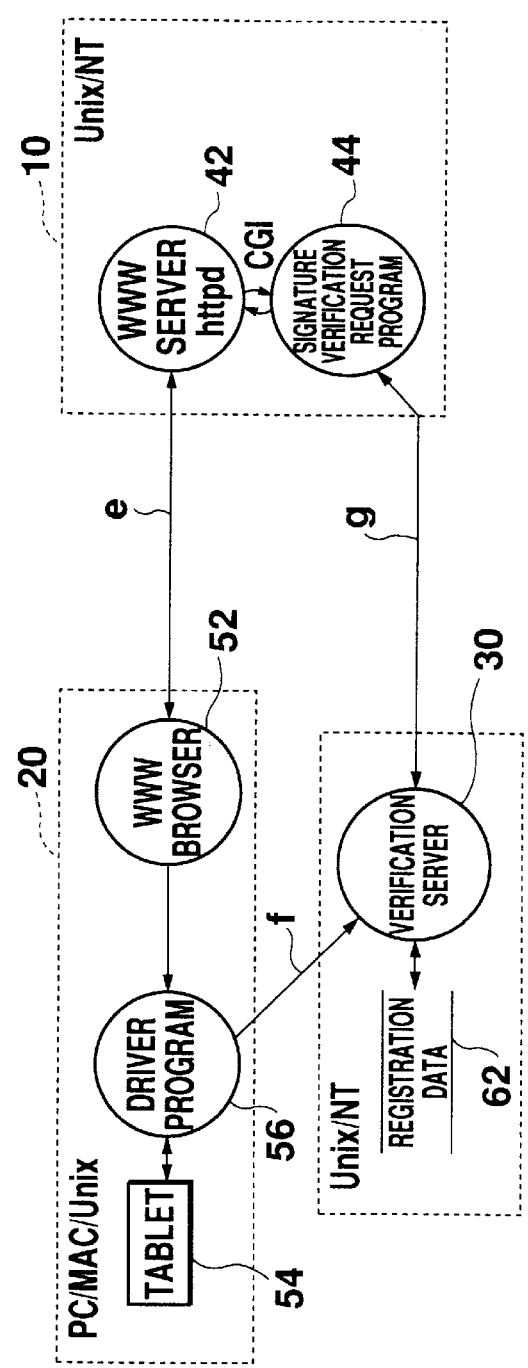
FIG. 2B is a drawing showing a detailed configuration of a preferred embodiment.

FIG. 2B corresponds to FIG. 1B. In FIG. 2B, the configuration of the application server 10, the application client 20, and the verification server 30 are identical to that shown in FIG. 2A. The only difference is that the driver program 56 of application client 20 sends the authentication data directly to verification server 30. The exchange of messages indicated by "e", "f", and "g" in FIG. 2B correspond with FIG. 1B.

In the preferred embodiments, the registration data 62 is saved on a memory means such as on a hard disk or optical disk in the verification server 30 and is managed and searched as a relational database (hereinafter, RDB). The format of the registration data within the RDB is shown in FIG. 3. As can be seen in FIG. 3, the registration data is in the form of a table and the designated data is recorded separately for each authorized user. As indicated in the figure, there is a flag to indicate various states within the system, used, for example, as a remove flag (to indicate whether a user has been removed from the system). The system unique key is a system key assigned to each user, and is unique in the verification server's table. The registered tablet type is a code for the type of tablet used by the user. The signature data is time-sequenced data expressing the movement of the electronic stylus on the tablet. This signature data not only includes the two-dimensional image data, but can also include measures of the stylus point pressure and speed, allowing for precise user authentication.

Thus, the verification server, uses the system unique key to search the RDB for the registered signature data, compares the registered signature data with that received from application server 10 and verifies its validity. The processing of the result of verification is explained later.

In the preferred embodiment, the RDB aside from the system unique key and the signature data, also includes the items grouped as "System Required Data" in FIG. 3: user name (Name), the user's date of birth (Date of Birth) and the user's telephone number (Phone #). These items can be used as substitutes for the system unique key. That is, as is explained later, although the system unique key is generally used by the application server 10 and the verification server 30 as the user identification key, the user does not always remember his/her assigned system unique key. Therefore, when the user wishes to access his/her registered signature data, it is preferable that there are means to identify the user other than the system unique key. The System Required Data allow the user to be identified using not only the system unique key but also the user's name, date of birth, or telephone number, etc.

These System Required Data are the other specified data for network users discussed above. Further, the system unique key is the identification code for network users, also discussed above.

Thus, valid authentication data is retrievable not only based on the system unique key, but also on the basis of other specified data, making it possible to verify authentication data using telephone numbers, etc., as the key even in cases where the user has forgotten his/her system unique key.

Further, in the preferred embodiment, as shown in FIG. 3, there are provisions for optional fields (Optional Fields). Data registered in the Optional Fields could be management data for checking the system, and can be used by the system administrator in administering the operation of the verification server 30. As shown in FIG. 3, these Optional Fields can contain various sorts of data: Creation Date, Creation Host, last access date (Last Acc. Date), last accessing user (Last Acc. By), access count, failure count, etc.

The application server 10 also has an RDB with information on users in which some of the data corresponds to the RDB in the verification server 30. The contents of the RDB on the application server 10 are shown in FIG. 4. Various data are registered for each user. The verification server name designates the verification server to be used for verifying the authentication data (signature data) sent by the application client 20. In the configuration shown in FIG. 1A or FIG. 1B, only one verification server 30 is depicted, however, it is possible to configure a network with a plurality of verification servers 30, as described above.

The flag and system unique key shown in FIG. 4 are identical to the flag and system unique key of FIG. 3. As mentioned above, the system unique key is unique within the verification server 30. However, for users assigned to different verification servers 30, it is possible to assign the same system unique key. Therefore, strictly speaking, identification of the user is made by a combination of system unique key and verification server name. The application user key (App. User Key) and optionally, additional application user keys (additional App. User Key) can be used to indicate whether and at what level the user is eligible to receive the services provided by the application server 10. Further, the creation date, last access date (Last Acc. Date), last accessing user (Last Acc. By), access count, and failure count can are also be recorded, in correspondence with the RDB on the verification server 30 shown in FIG. 3. Further, although the details are not shown, it is also possible to have other specified registration data in application optional fields.

FIG. 5 is a table explaining the protocols supported by the verification server in the preferred embodiments. The protocol "key registration" is used to send a message containing the system required data from the application server 10 to the verification server 30. The verification server registers these system required data in its RDB and generates a system unique key. This system unique key is registered in the verification server's RDB and also sent to the application server 10. In this manner, the system unique key used to identify the user is generated by the verification server. This system unique key is also registered in the RDB on the application server 10, and thus the verification server 30 and the application server 10 use the same system unique key.

In the protocol "signature data registration", the system unique key, three signature data blocks, the tablet type, etc. are sent from the application server 10 to the verification server 30, and the valid signature data is registered in the verification server's RDB in relation to the system unique key. Here, three signature data blocks are transmitted so that the verification server can determine the composite values for the signature data, and use these composite values in the RDB. If the registration is successful, an "OK" is returned to the application server 10. On the contrary, in cases such as when registration has already been completed, an "error" is returned. Further, if there is too much of a discrepancy between the three signature data blocks, registration is not completed and an "unstable" is returned to indicate that the signature data is too unreliable.

In the protocol "verification preparation", the application server 10 sends only the system unique key to the verification server 30, which prompts it to read the valid authentication data from the RDB into the cache. Reading the valid authentication data before the verification protocol is used to expedite the verification process, and can be omitted, so that only the "verify" protocol is used, as explained below. If valid authentication data is successfully read into the cache, a message ID and encryption key are returned to the application server 10, otherwise, an "error" is returned. The encryption key is used to encrypt the transmitted data; if encryption is unnecessary, there is no need to send an encryption key.

The protocol "verify" is used when the application client 20 or the application server 10 sends the system unique key, signature data, tablet type, and the message ID to the verification server 30 for verification.

The message ID is particularly important when the "verification preparation" protocol has been used and a message ID has been generated. As explained below, the message ID is used as a tag to identify which user is being authenticated when the verification result is sent to the application server 10. In other words, in the preferred embodiment, this message ID acts as both an identification number in the authentication process and an indicator that the valid authentication data has already been read into the cache. In this case, the message ID is first created by the verification server 30 and is appended to the reply to a verification preparation request.

If the verification preparation protocol has not been issued, the message ID simply acts as an identifier, identifying which user is being authenticated. In such cases, the message ID is first created by the application server 10.

If the message ID was added by the verification server, the verification server knows that valid authentication data has already been read into the cache. If valid authentication data has already been retrieved, the authentication data which has been received is compared against it. If valid authentication data has not yet been retrieved, valid authentication data is retrieved from the RDB, and a comparison is conducted.

If the two data are extremely close based on comparison, the user is authenticated, and the value "yes" is sent to the application server 10. On the other hand, if the received authentication data is very different from the valid authentication data, a "no" is sent. If, as a result of the comparison, it is uncertain whether the authentication data is valid, the value "maybe" is returned to the application server 10. In this case, although differences may exist depending on the application server, the user can be requested to provide the signature data one or more additional times. Further, if valid authentication data cannot be located, an "error" is returned to the application server 10.

Figure 6:
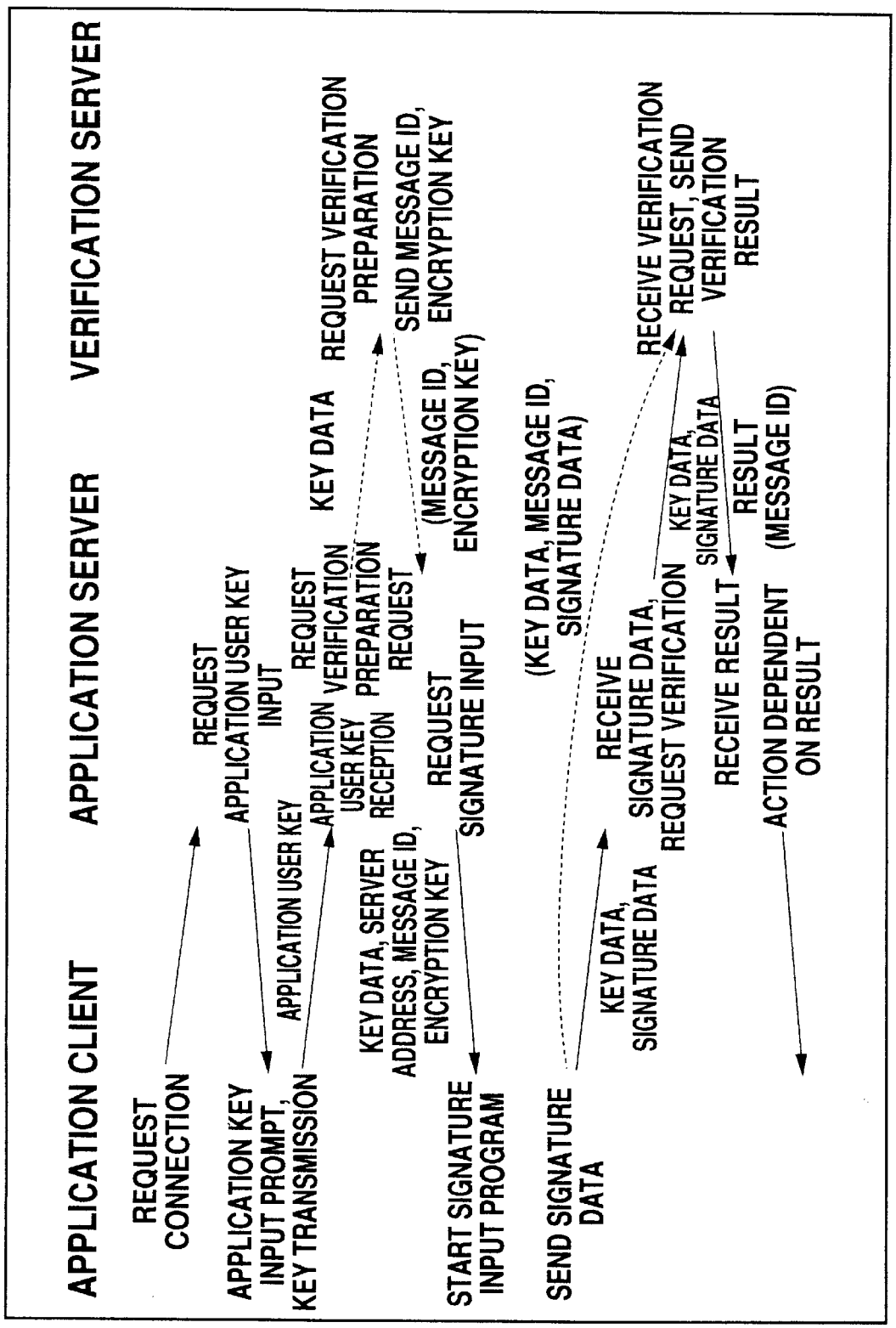
FIG. 6 is a diagram explaining the exchange of messages in the preferred embodiments.

The process flow in the authentication of a user will be described with reference to FIG. 6. First, the application client 20 requests a connection to application server 10.

In response to this, application server 10 requests the application client 20 to input the application key. In response, a prompt is shown on the display device of application server 20 asking for the application server key.

When the user enters the application user key on the keyboard of application client 20, this data is sent to application server 10.

Upon receiving this data, application server 10 sends a verification preparation request, which includes the key data, system unique key and application user key, to verification server 30. This verification preparation request is to speed up the process, and may be omitted, as described above.

Upon receiving the verification preparation request, the verification server 30 reads the authentication data from the RDB into the cache, and sends a message ID and an encryption key to application server 10.

Upon receiving the above-mentioned message ID, etc., the application server 10 asks the application client 20 for signature input.

Responding to the signature input request, the application client 20 launches a signature input program, and the signature is input through a tablet 54 attached to application client 20.

In the configuration shown in FIG. 1A, the application client 20 sends the key data and the input signature data to the application server 10. And, the application server 10 then issues a verification request, including the received signature data, to the verification server 30. On the other hand, in the configuration shown in FIG. 1B, the application client 20 sends the input signature data directly to the verification server 30 as a verification request. In this instance, as is shown in FIG. 6, key data, which includes the system unique key, the application user key, and, if necessary, an encryption key, and a message ID are sent together with the signature data to the verification server 30.

The verification server 30 performs the verification and sends the result to the application server 10. If the verification request was received from the application server 10, the destination of the verification result is the application server 10 which issued the verification request. On the other hand, if the verification request was received from the application client 20, the destination application server 10 is determined on the basis of the message ID which was received as a part of the verification request.

The application server 10 performs a certain procedure based on the verification result. Although the process may differ for different application servers 10, generally when the authentication data matches, the user is allowed access, and otherwise the user is disconnected or is requested to repeat the signature input.

As described above, since the verification process is performed by an external verification server, it is possible to diminish the burden on the application server and simplify the verification process. Through the use of a single verification server by a plurality of application servers, a more efficient use of network resources can be realized.

In contrast to the conventional method in which each application server performs verification processes independently, in the first aspect of the invention, the configuration of each application server is simplified due to the centralization of the verification function. As a result, the efficient use of network resources and the centralized management of user authentication data are realized.

Further, in the verification server described in the second aspect of the invention, in addition to a basic identification data, other specified data can also be used to access the valid authentication data, making it possible to verify the authentication data even if the basic identification data has been lost.

Further, in accordance with a third aspect of the invention, a verification server with faster verification processing can be realized using cashing.

What is claimed is:

1. A verification server which verifies entered authentication data entered by network users through networks, comprising:

memory means for storing valid authentication data of authorized network users, wherein the valid authentication data includes biometric information unique to an authorized network user and the information is supplied by the authorized network user;

search means for retrieving the valid authentication data of the authorized network users from the memory means in response to verification requests from external sources;

verification means for comparing and verifying the entered authentication data against the valid authentication data retrieved by the search means in response to verification requests; and sending means for sending the verification results via networks to an application program on the networks according to the content of said verification requests, wherein said application program asks the network user to enter the authentication data.

2. The verification server of claim 1, wherein the memory means comprises a table which includes identification data for the authorized network users, valid authentication data for the authorized network users, and other specified data concerning the authorized network users, and the search means retrieves the valid authentication data and at least one of the identification data or the other specified data from the memory means.

3. The verification server of claim 1, further comprising:

cache control means for reading the valid authentication data from the memory means and for storing the valid authentication data in a cache having an access speed faster than that of the memory means.

4. The verification server of claim 1, wherein the biometric information includes at least one of signature data, fingerprint data, retinal pattern data or palm print data.

5. The verification server of claim 2, wherein the other specified data includes at least one of user name data, telephone number data, birth date data or blood type data.

* * * * *